Aug. 5, 1952  E. C. KIEKHAEFER  2,605,850
SLIP CLUTCH FOR PROPELLERS
Filed June 8, 1949
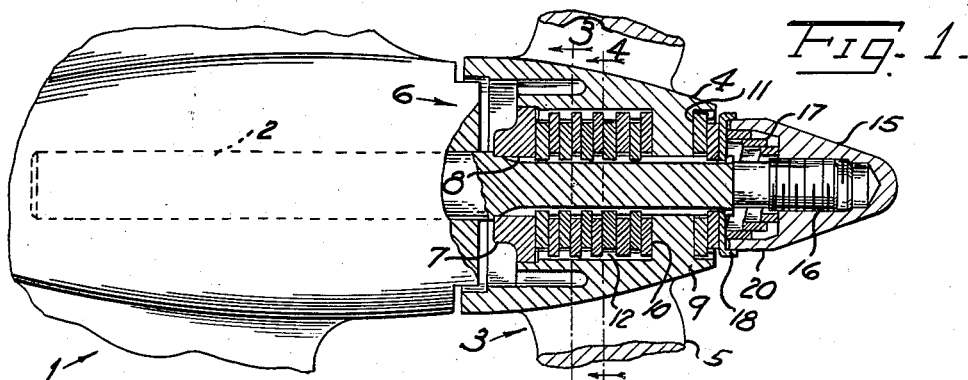
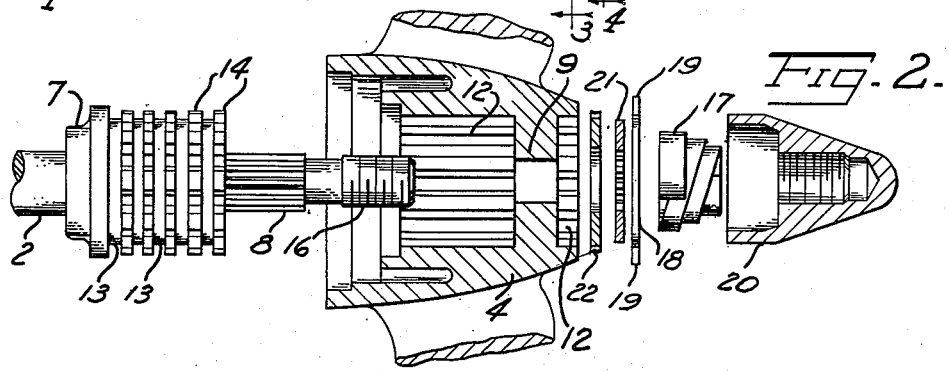
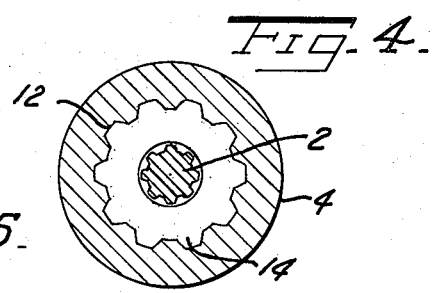
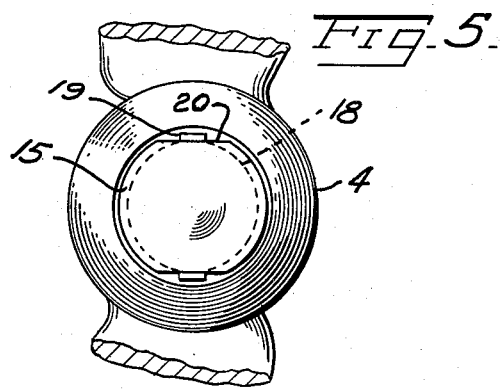
INVENTOR.
*Elmer C. Kiekhaefer.*
BY *Andrus & Sceales*
  *Attorneys.*

Patented Aug. 5, 1952

2,605,850

UNITED STATES PATENT OFFICE 2,605,850

SLIP CLUTCH FOR PROPELLERS

Elmer C. Kiekhaefer, Cedarburg, Wis.

Application June 8, 1949, Serial No. 97,735

2 Claims. (Cl. 170—135.75)

This invention relates to propellers for outboard motors and the like and particularly to means for protecting the propeller from damage.

The invention provides a slip clutch within the hub of the propeller through which the rotational forces of the shaft carrying the propeller are transmitted which comprises a series of discs and a spring carried by the shaft biasing the propeller axially in the direction of propeller thrust to effect therewith the operativeness of the discs.

An object of the invention is to provide a clutch which is instantly disengaged when the propeller strikes a submerged object to prevent damage to the propeller.

A more particular object is to reduce the axial travel of the propeller on the shaft required to operate the clutch when the propeller strikes a submerged object.

Another object is to provide protection of the propeller throughout the range of operation of the motor.

A more particular object is to ensure the required frictional engagement of the clutch discs independently of the thrust of the propeller, as required to prevent slippage at peak loads.

Another object of the invention is to prevent "burning out" of the clutch unit.

These and other objects and advantages of the invention will be more fully set forth in the following description of a preferred embodiment of the invention as illustrated in the accompanying drawings.

In the drawings:

Figure 1 is a side elevation of the lower end propeller unit of an outboard motor with a portion thereof and of the propeller hub broken away and sectioned.

Fig. 2 is a view similar to Fig. 1 showing the propeller hub and slip clutch disassembled from the propeller shaft;

Fig. 3 is a transverse section taken on line 3—3 of Fig. 1;

Fig. 4 is a transverse section taken on line 4—4 of Fig. 1; and

Fig. 5 is an end elevation of the propeller unit.

In the drawing, the lower end unit 1 for an outboard motor, as shown, carries the propeller shaft 2 and the propeller 3 mounted on shaft 2 rearwardly of the unit. The streamlined, hollow hub 4 of the propeller carrying the blades 5 is of circular cross-section throughout and houses the friction disc clutch unit 6, as will be described.

The bushing 7 of unit 6 is mounted on shaft 2 at the forward end of the splined section 8 of shaft 2 and supports the forward end of hub 4 for free rotation thereon. The transverse section 9 near the rear of hub 4 is supported directly upon shaft 2 freely with respect to the splined section 8 and is provided with flat, circular forward and rear clutch faces 10 and 11, respectively. The inner splines 12 in hub 4 extend forwardly and rearwardly of section 9 within hub 4. The friction clutch discs 13 and 14 are disposed within hub 4 between bushing 7 and section 9 of the hub and are alternately arranged. Discs 13 are internally splined to fit on and engage the splined section 8 of shaft 2 and are free to rotate within hub 4. Discs 14 are free to rotate on shaft 2 and are externally splined to engage splines 12 of hub 4 to rotate therewith.

A limited axial movement of hub 4 is provided for on shaft 2 and bushing 7 so that discs 13 and 14 may be moved axially into varying frictional engagement.

The tapered nut 15 on the threaded end 16 of shaft 2 is recessed at its forward end which overhangs the splined section 8 of the shaft to enclose the spring 17 disposed on shaft 2. The washer 18 is splined to fit splines 8 and closes the forward end of nut 15. The tabs 19 of washer 18 are adapted to be bent rearwardly into corresponding slots 20 in the outer edge of nut 15 to lock or prevent loosening of the same on shaft 2.

The splined disc 21 secured on section 8 of shaft 2 forwardly of washer 18 and the friction disc 22 between face 11 of hub 4 and disc 21 engaging splines 12 of hub 4 provide a bearing surface supporting spring 17, as will be described.

Nut 15 is adjusted on the threaded end 16 of shaft 2 so that spring 17 exerts a definitely determined force against washer 18 forwardly on shaft 2 and against discs 21 and 22 and face 11 of hub 4. The biasing of hub 4 forwardly on shaft 2 by spring 17 compresses discs 13 and 14 of clutch unit 6 between bushing 7 and face 10 of the hub to provide the necessary torque transmission between shaft 2 and hub 4 for the initial operation of propeller 3.

The spring 17 is also disposed with respect to clutch unit 6 so that the minimum frictional clutch engagement for initial operation, as described above, obtains throughout the operation of the unit and so that the capacity of the clutch will not fall below the power output of the motor. The spring 17 thus provides a marginal capacity at all times which precludes the possibility of overload of the clutch under operating conditions.

The size of discs 13 and 14 employed should provide sufficient frictionally engaging areas to carry the maximum rotational torque load.

As many discs 13 and 14 may be employed as required. It has been found that any practical number of discs employed in the relation shown will require considerably less axial movement than in other constructions of the propeller to effect the engagement and release of clutch unit 6. Thus, when a propeller blade 5 strikes an object that would damage the propeller in normal operation rotating at speeds up to 4000 R. P. M., the propeller which is pressed forwardly by the thrust of the blades must move rearwardly on shaft 2 instantly thereafter to release immediately clutch unit 6 if damage to the propeller is to be avoided. Also, by disposing the discs forwardly of the solid section 9 of the propeller hub, as shown, an excessively long release stroke is avoided while the required minimum capacity of clutch unit 6 is ensured by spring 17 which is in operation at all times to effect a minimum clutch engagement of discs 13 and 14 and which at all times throughout the range of operation of the propeller supplements the propeller thrust so that slippage of the propeller under excessive loads, as under acceleration, is precluded.

Various embodiments of the invention may be employed within the scope of the accompanying claims.

I claim:

1. In an outboard motor and the like, a propeller having a series of stepped bores extending centrally therethrough, said bores including an internally splined bore intermediate a larger bore opening forwardly of the hub and a smaller bore opening rearwardly of the hub with respect to the direction of normal propeller thrust, the section of said hub defining the rear bore providing an annular shoulder immediately to the rear of the intermediate bore and providing oppositely thereof the rear face of the hub, the forward section of the hub forming the forward bore of a diameter at least equal that of the maximum diameter of said intermediate splined bore, a propeller shaft having a shoulder facing rearwardly and a rear threaded end, splines formed in said shaft intermediate the shoulder and threaded end thereof, a thrust plate mounted on said splines and against the shoulder of said shaft, a series of friction discs mounted on said shaft rearwardly of said thrust plate, alternate discs of said series being splined at the inner circumference thereof and interlocked with the splines of said shaft and the other discs of said series being splined at the outer circumference thereof and interlocked with the splined intermediate bore of said hub, said hub being rotatably mounted on said shaft and supported for limited axial movement in the forward bore on and with respect to said thrust plate and directly on and with respect to said shaft passing through the rear bore, a nut turned and secured on the threaded end of said shaft, and a spring disposed on said shaft intermediate said nut and the rear face of said hub urging the latter forwardly on said thrust plate and shaft in the direction of propeller thrust, said discs being disposed between said thrust plate and said first named shoulder and urged in frictional inter-engagement to maintain a minimum rotative driving connection between said shaft and said propeller subject to increase by the thrust of the propeller and subject to slippage upon overloading.

2. In an outboard motor and the like, a propeller having a series of stepped bores extending centrally therethrough, said bores including an internally splined bore intermediate a larger bore opening forwardly of the hub and a smaller bore opening rearwardly of the hub with respect to the direction of normal propeller thrust, the section of said hub defining the rear bore providing an annular shoulder immediately to the rear of the intermediate bore and providing oppositely thereof the rear face of the hub, the forward section of the hub forming the forward bore of a diameter at least equal that of the maximum diameter of said intermediate splined bore, a propeller shaft having a shoulder facing rearwardly and a rear threaded end, splines formed in said shaft intermediate the shoulder and threaded end thereof, a thrust plate mounted on said splines and against the shoulder of said shaft, a series of friction discs mounted on said shaft rearwardly of said thrust plate, alternate discs of said series being splined at the inner circumference thereof and interlocked with the splines of said shaft and the other discs of said series being splined at the outer circumference thereof and interlocked with the splined intermediate bore of said hub, said hub being rotatably mounted on said shaft and supported for limited axial movement in the forward bore on and with respect to said thrust plate and directly on and with respect to said shaft passing through the rear bore, and means including a nut secured on the threaded end of said shaft and securing the hub forwardly on said thrust plate and shaft in the direction of propeller thrust, said discs being disposed between said thrust plate and said first named shoulder and secured in frictional inter-engagement to effect a rotative driving connection between said shaft and said propeller subject to increase by the thrust of the propeller and subject to slippage upon overloading of the propeller.

ELMER C. KIEKHAEFER.

REFERENCES CITED

The following references are of record in the file of this patent:

UNITED STATES PATENTS

| Number | Name | Date |
| --- | --- | --- |
| 1,472,077 | Lockwood | Oct. 30, 1923 |
| 2,402,197 | Kincannon | June 18, 1946 |